United States Patent [19]

Sacripante et al.

[11] Patent Number: 5,039,773
[45] Date of Patent: Aug. 13, 1991

[54] TONER AND DEVELOPER COMPOSITIONS WITH THERMOTROPIC LIQUID CRYSTALLINE POLYMERS

[75] Inventors: Guerino Sacripante, Cambridge; Lupu Alexandru, Toronto, both of Canada

[73] Assignee: Xerox Corporation, Stamford, Conn.

[21] Appl. No.: 416,200

[22] Filed: Oct. 2, 1989

Related U.S. Application Data

[62] Division of Ser. No. 252,472, Oct. 3, 1988.

[51] Int. Cl.$^5$ .............................................. C08G 63/64
[52] U.S. Cl. ................................. 528/176; 528/179; 528/183; 528/191; 528/194; 528/195; 528/196; 525/437; 525/439; 525/444; 525/449
[58] Field of Search ............... 528/176, 179, 183, 191, 528/194, 195, 196; 525/437, 439, 444, 449

[56] References Cited

U.S. PATENT DOCUMENTS

| | | | |
|---|---|---|---|
| 4,543,313 | 9/1985 | Mahabadi et al. | 430/109 |
| 4,617,371 | 10/1986 | Blumstein et al. | 528/194 |
| 4,729,847 | 3/1988 | Miyazawa et al. | 252/299.64 |

*Primary Examiner*—John Kight, III
*Assistant Examiner*—S. A. Acquah
*Attorney, Agent, or Firm*—E. O. Palazzo

[57] ABSTRACT

Thermotropic liquid crystalline polymers represented by the formulas as illustrated in FIGS. 1 and 2 wherein m, n, and o represent the number of monomer segments present; and x, y, and z are independently selected from the group consisting of alkyl, substituted alkyl, alkylene, and substituted alkylene.

11 Claims, 8 Drawing Sheets

Wherein each R independently represents hydrogen, hydroxyl, halogen, nitro, alkoxy, arylalkoxy, or alkyl

TONER AND DEVELOPER COMPOSITIONS WITH THERMOTROPIC LIQUID CRYSTALLINE POLYMERS

This is a division of application Ser. No. 252,472, filed Oct. 3, 1988.

BACKGROUND OF THE INVENTION

This invention is generally directed to toner and developer compositions, and more specifically the present invention is directed to novel thermotropic liquid crystalline polymers, and processes for the preparation thereof. The thermotropic liquid crystalline polymers of the present invention are preferably random copolymers, and more preferably random copolyesters with three or more spacer groups therein many of which are as illustrated in FIGS. 1 to 16. The aforementioned polymers can be selected as resins for toner compositions, including magnetic, single component, and colored toner compositions. In one embodiment of the present invention, the low melting toner compositions are comprised of the thermotropic liquid crystalline random copolyesters resin particles illustrated herein, pigment particles, and optional additive particles. There are also provided in accordance with the present invention positively charged toner compositions comprised of the thermotropic liquid crystalline resin particles illustrated herein, pigment particles, and charge enhancing additives. In addition, the present invention is directed to developer compositions comprised of the aforementioned toners, and carrier particles. Furthermore, in another embodiment of the present invention there are provided single component toner compositions comprised of the thermotropic liquid crystalline resin particles illustrated herein, magnetic components such as magnetites, and optional additive particles. The toner and developer compositions of the present invention are useful in electrophotographic imaging and printing processes, especially xerographic processes. Further, the developer compositions of the present invention possess stable electrical properties for extended time periods, and in some instances with these compositions, for example, there is no substantial change in the triboelectrical charging values.

Although liquid crystalline polymers are generally known and can be selected as films or resin toners, in many instances these polymers possess inferior mechanical, transport and/or storage properties, that is agglomeration results with extended storage, and moreover such polymers in some instances possess high melting properties, that is a melt temperature above 100° C. and thus are melt processable at from about 130° to 300° C. In contrast, the polymers of the present invention are melt processable, for example, at from about 90° to about 130° C. Specifically, toner compositions with certain liquid crystalline thermotropic polymers are illustrated in U.S. Pat. No. 4,543,313, the disclosure of which is totally incorporated herein by reference. The aforementioned polymers do not contain three spacer groups therein and further do not possess many of the advantages associated with the thermotropic liquid random copolyesters of the present invention which exhibit low melting properties. Also, the polymers of the '313 patent do not contain two different spacer groups. Accordingly, with the polyesters of the present invention and the toner compositions thereof, agglomeration and physical or mechanical integrity, particularly at temperatures of from about 40° to about 75° and preferably about 60° C., are retained and these materials exhibit low thermal properties such as low melting temperatures, low softening point temperatures and low viscosities at temperatures at from between about 55° to 105° C. and more preferably between about 60° and about 95° C. enabling them to be more readily melt processable. Specifically, the thermotropic liquid crystalline copolyester polymers of the present invention possess acceptable glass transition temperatures of up to about 75° C. and preferably from about 40° to about 60° C., and low melting temperatures of from about 55° to about 105° C. and preferably from about 60° to about 95° C.

Other references of interest which disclose the use of amides as toner additives include U.S. Pat. Nos. 4,072,521; 4,073,649; and 4,076,641. Furthermore, references of background interest are U.S. Pat. Nos. 3,165,420; 3,236,776; 4,145,300; 4,271,249; 4,556,624; 4,557,991; and 4,604,338.

Also, there was selected as a result of a patentability search U.S. Pat. Nos. 4,514,540; 4,617,371; 4,687,360; and 4,729,847. The '371 patent discloses polymeric liquid crystals which contain mesogene and spacer units in alternating sequence, which polymers may further contain aliphatic substituents. The spacer moieties may be compounds with a flexible hydrocarbon chain with terminal functional groups at both ends of the chain that react under appropriate reaction conditions to form linkages with the mesogenic monomers, see column 5, lines 38 to 43, for example. The '540 patent relates to a copolymer reaction product useful in flexographic ink compositions, which copolymer contains up to 25 percent of a synthetic polymeric resin with a crystalline chain structure. Resin components employed in the preparation of the polymeric compositions of this patent include, for example, copolymers of styrene or acrylate/methacrylate esters with acrylics. There is disclosed in the '847 patent a chiral liquid crystal substance with an optically active group and a chiral liquid crystal composition containing the aforesaid group. Also, there is disclosed in this patent the selection of various esters for the synthesis of the optically active compound. In the '360 patent, there is disclosed a thermal transfer ribbon including a partially crystalline polymer, which polymer can be derived from an acid containing at least one carboxylic acid moiety.

Moreover, toner and developer compositions containing charge enhancing additives, especially additives which impart a positive charge to the toner resin, are well know. Thus, for example, there is described in U.S. Pat. No. 3,893,935 the use of certain quaternary ammonium salts as charge control agents for electrostatic toner compositions. There is also described in U.S. Pat. No. 2,986,521 reversal developer compositions comprised of toner resin particles coated with finely divided colloidal silica. According to the disclosure of this patent, the development of images on negatively charged surfaces is accomplished by applying a developer composition having a positively charged triboelectric relationship with respect to the colloidal silica. Further, there is illustrated in U.S. Pat. No. 4,338,390, the disclosure of which is totally incorporated herein by reference, developer and toner compositions having incorporated therein as charge enhancing additives organic sulfate and sulfonate compositions; and in U.S. Pat. No. 4,298,672, the disclosure of which is totally incorporated herein by reference, positively charged toner compositions containing resin particles and pigment particles, and as a charge enhancing additive alkyl pyridinium compounds, inclusive of cetyl pyridinium chloride.

Other prior art disclosing positively charged toner compositions with charge enhancing additives include U.S. Pat. Nos. 3,944,493; 4,007,293; 4,079,014; and 4,394,430.

Although the above described toner and developer compositions are useful for their intended purposes, there is a need for improved compositions. More specifically, there is a need for toner compositions, including single component compositions which possess some advantages not achievable with the prior art compositions including lower melting temperatures of from about 55° C. to about 105° C. There is also a need for thermotropic liquid crystalline polymers with three or more spacer groups. In addition, there is a need for toner and developer compositions that maintain their triboelectrical characteristics for extended time periods exceeding, for example, 100,000 developed images. Furthermore, there is a need for single component toners, and colored toners that possess many of the aforementioned characteristics. Also, there is a need for positively charged toner compositions with charge enhancing additives therein.

SUMMARY OF THE INVENTION

It is an object of the present invention to provide liquid crystalline thermotropic polymers, and toner and developer compositions containing these polymers with many of the advantages illustrated herein.

Also, in another object of the present invention there are provided low melting toner compositions with thermotropic liquid crystalline random copolymers, preferably copolyesters as illustrated herein.

Another object of the present invention resides in the provision of toner and developer compositions with stable triboelectrical characteristics for extended time periods.

Furthermore, in another object of the present invention there are provided positively charged and negatively charged toner and developer compositions useful for the development of images present on positively or negatively charged imaging members.

In another object of the present invention there are provided positively charged toner compositions which are useful for causing the development of electrostatic latent images, including color images.

In yet another object of the present invention there are provided single component toner compositions with the thermotropic liquid crystalline polymers illustrated herein.

Additionally, in still another object of the present invention there are provided electrophotographic imaging and printing for the development of images including colored images.

In yet another object of the present invention there are provided developer compositions containing low melting toner compositions with the thermotropic liquid crystalline random copolymers illustrated herein.

These and other objects of the present invention are accomplished by providing liquid crystalline polymers preferably with three spacer groups therein, which polymers can be selected as resins for toner compositions. More specifically, the present invention is directed to thermotropic liquid crystalline random copolymers with three spacer groups of the formulas as illustrated in FIGS. 1 and 2, wherein x, y, and z are independently selected from alkyl, alkylene, substituted alkyl, and substituted alkylene, subject to the provision in a preferred embodiment that x, y, and z represent different groups; and m, n, and o represent the number of monomer segments present in the copolymer.

Alkyl and alkylene groups include those with from 1 to about 25 carbon atoms such as methyl, methylene, ethyl, ethylene, propyl, propylene, butyl, butylene, pentyl, pentylene, and the like. Examples of substituents present on the alkyl or alkylene groups include, for example alkyl as illustrated herein, such as methyl, ethyl, propyl, butyl, hexyl, lauryl, and the like; alkoxy and arylalkoxy such as methoxy, ethoxy, propoxy, butoxy, pentoxy, octaoxy, brassiloxy, phenoxy; nitro; halogen including fluorine, bromine, iodine, and chlorine; cyano; hydroxyl; and the like. Alkoxy groups as utilized herein thus include those components with from about 1 to about 25 carbon atoms. Aryl includes those components with from about 6 to about 24 carbon atoms such as phenyl. Also, the sum of m, n, and o is equal to 100 percent, thus m can be from about 1 to about 99 percent, n can be from about 1 to about 99 percent, and o can be from about 1 to about 99 percent. Preferably, the values of m, n, and o are about 33 percent. Generally, the weight average molecular weight of the polymers of the present invention are from about 5,000 to about 50,000, and preferably from about 10,000 to about 35,000.

Figure 15:
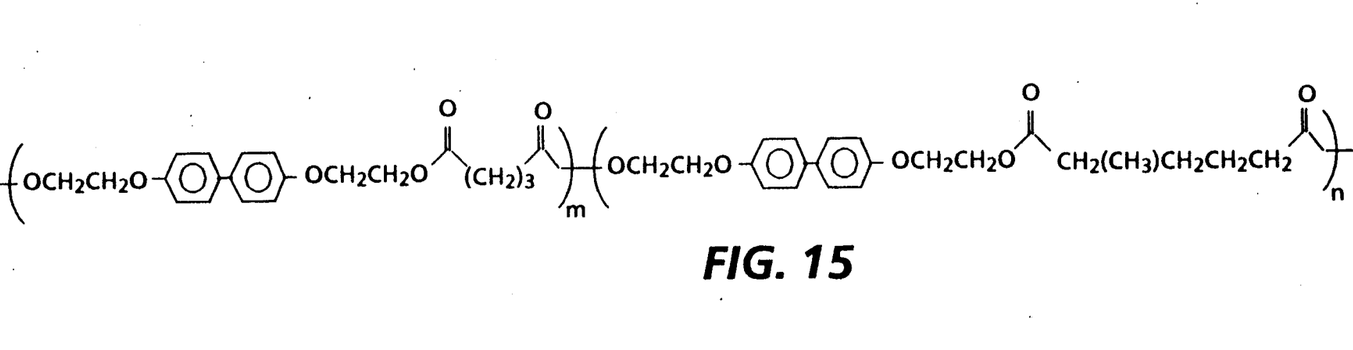
Figure 16:
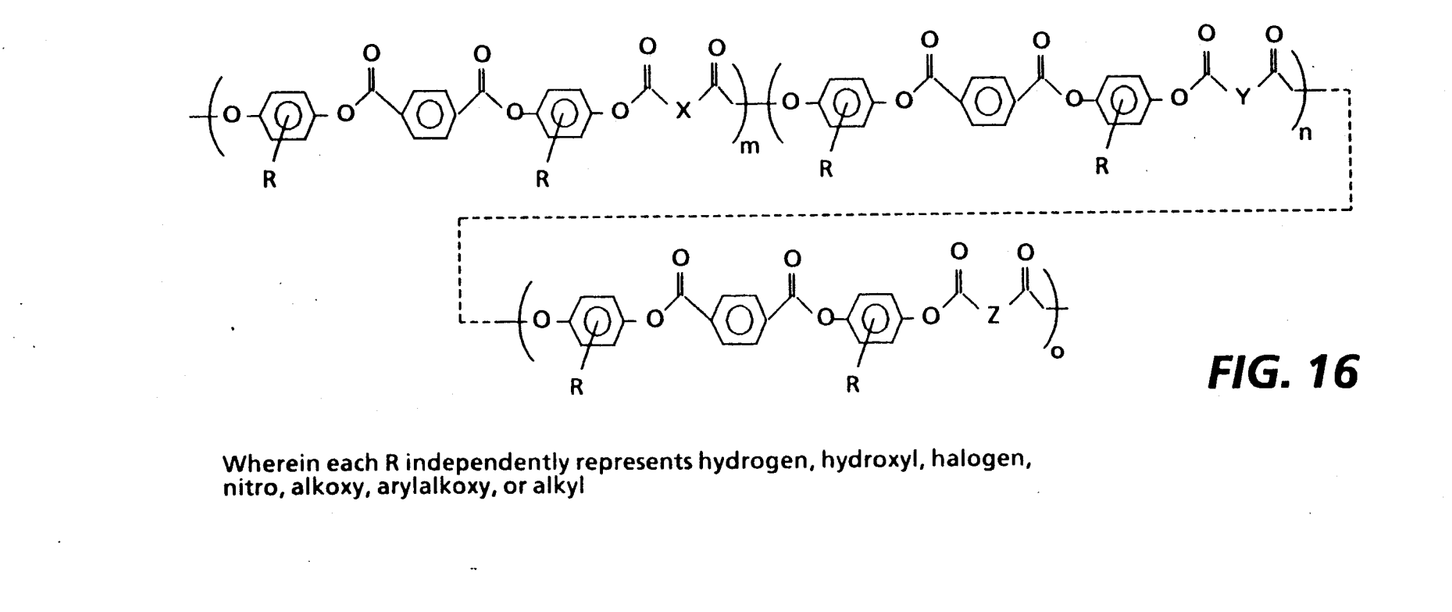

Specific examples of thermotropic liquid crystalline random copolymers of the present invention are illustrated in FIGS. 3 to 16 wherein m, n, and o represent the number of monomer units and R is as defined herein with reference to FIG. 16.

Figure 1:
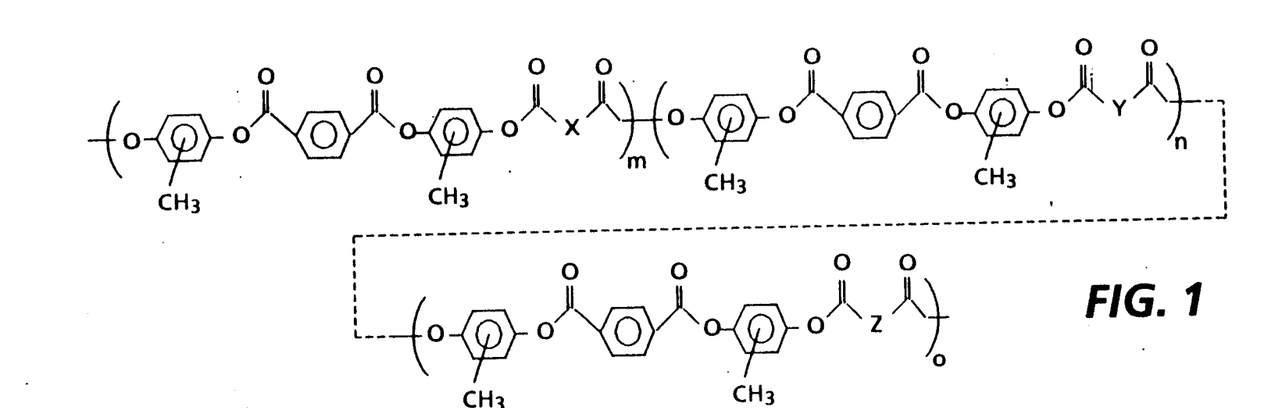
Figure 2:
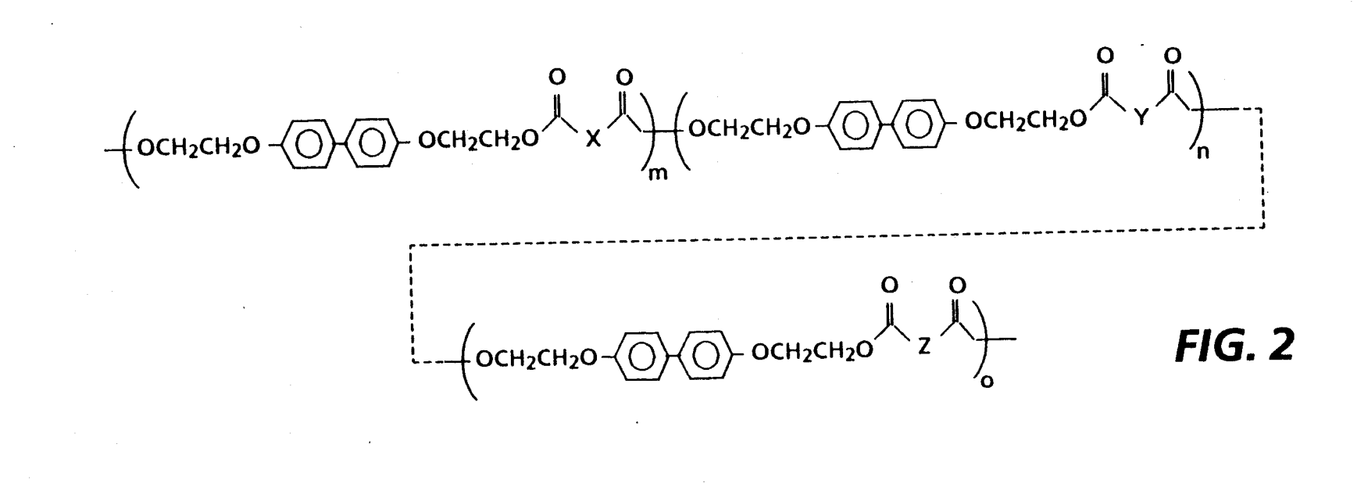

The random thermotropic liquid crystalline copolymers of the present invention, and more specifically those represented by FIG. 1, are generally prepared by the copolymerization of an appropriate aromatic component such as p,p-di-(alkylaryloxy)-tetraphthalate with three different aliphatic diacid halides, such as adipoyl chloride, pimeloyl chloride, glutaryl chloride, sebacoyl chloride, the corresponding bromides, fluorides, iodies, and the like, in the presence of an acid acceptor such as pyridine or triethylamine and a halogenated solvent such as dichloromethane. The random thermotropic liquid crystalline copolymers of the present invention represented by FIG. 2 are generally prepared by the condensation of an aromatic biphenol mesogen with an alkylene oxide or a halogenated alcohol in the presence of an alkali hydroxide in an alcohol. The resulting mesogen spacer is then copolymerized with two or three different aliphatic diacid halides with an acid acceptor such as trialkylamines and a solvent such a halogenated alkane including dichloromethane. Generally, the reaction for the preparation of the aforementioned liquid crystalline copolymers of the present invention is accomplished at a temperature of from about 10° C. to about 50° C. and preferably from about 15° C. to about 45° C. In one specific embodiment, the copolyesters as represented by FIGS. 1 and 2 can be prepared by reacting from about 0.8 mole to about 1 mole of p,p-di-(methylphenoxy)-terephthalate or a biphenyl-diethanol with from about 0.8 to about 1 mole of an aliphatic diacid chloride mixture containing at least two, or at least three different spacers such as adipoyl chloride, and the like as indicated herein at a temperature of about 15° to about 25° C. This reaction is generally effected in the presence of from about 1 mole to about 3 moles of an acid acceptor such as triethylamine or pyridine, and the like, and an excess amount, that is an amount sufficient to dissolve the reactants of organic solvents, such as aliphatic halogenated hydrocarbons including methylene chloride. Thereafter, the resulting product is separated from the reaction mixture by known techniques such as extraction, precipitation, followed by filtration, optionally washed, and identified by various analytical tools including elemental analysis, NMR, IR and UV. Accordingly, the polymers of the present invention, including those as represented by FIGS. 1 to 16 can be prepared by the aforementioned solution condensation processes, or by interfacial or melt condensation processes. In addition, the polymer products resulting possess intrinsic viscosities of from about 0.06 to about 0.75, and preferably from about 0.1 to about 0.55 deciliters per gram (dl/g).

The random polymers of the present invention can be selected as resins for toner compositions. In one embodiment the toner compositions are comprised of an effective amount, for example, from about 70 to about 90 percent by weight the random copolymer resin particles as represented by the formulas of FIGS. 1 to 16, pigment particles, and optional additive particles. Furthermore, there are provided in accordance with the present invention positively charged toner compositions comprised of the random copolymer resin particles as represented by FIGS. 1 to 16, pigment particles, and charge enhancing additives. Another embodiment of the present invention is directed to developer compositions comprised of the aforementioned toners, and carrier particles.

In addition, in accordance with the present invention there are provided developer compositions comprised of toner compositions containing resin particles comprised of the random copolymer resin particles as represented by FIGS. 1 to 16, pigment particles such as magnetites, carbon blacks or mixtures thereof, and optional charge enhancing additives, particularly for example distearyl dimethyl ammonium methyl sulfate, reference U.S. Pat. No. 4,560,635, the disclosure of which is totally incorporated herein by reference, and carrier particles. As preferred carrier components for the aforementioned compositions, there are selected steel or ferrite materials, particularly with a polymeric coating thereover including the coatings as illustrated in U.S. Ser. No. 751,922, entitled Developer Composition with Specific Carrier Particles, U.S. Ser. No. 136,792 and U.S. Ser. No. 136,791, each of the disclosures of which are totally incorporated herein by reference. One particularly preferred coating illustrated in the aforementioned '922 copending application is comprised of a copolymer of vinyl chloride and trifluorochloroethylene with conductive substances dispersed in the polymeric coating inclusive of, for example, carbon black. Another embodiment disclosed in the aforementioned '926 copending application is a developer composition comprised of styrene butadiene copolymer resin particles, and charge enhancing additives selected from the group consisting of alkyl pyridinium halides, ammonium sulfates, and organic sulfate or sulfonate compositions; and carrier particles comprised of a core with, for example, a coating of vinyl copolymers, or vinyl homopolymers.

Numerous well known suitable pigments can be selected as the colorant for the toner particles including, for example, carbon black, nigrosine dye, aniline blue, phthalocyanine derivatives, magnetites and mixtures thereof. The pigment, which is preferably carbon black, should be present in a sufficient amount to render the toner composition colored thereby permitting the formation of a visible image in electrophotographic imaging apparatus. Generally, the pigment particles are present in amounts of from about 2 percent by weight to about 20 percent by weight, based on the total weight of the toner composition, however, lesser or greater amounts of pigment particles can be selected providing the objectives of the present invention are achieved.

When the pigment particles are comprised of magnetites, including those commercially available as Mapico Black, they are present in the toner composition in an amount of from about 10 percent by weight to about 70 percent by weight, and preferably in an amount of from about 10 percent by weight to about 40 percent by weight. Alternatively, there can be selected as pigment particles mixtures of carbon black or equivalent pigments and magnetites, which mixtures, for example, contain from about 6 percent to about 70 percent by weight of magnetite, and from about 2 percent to about 15 percent by weight of carbon black. Particularly preferred as pigments are carbon black, magnetites such as Mapico Black, or mixtures thereof.

Also embraced within the scope of the present invention are colored toner compositions containing as pigments or colorants magenta, cyan, and/or yellow particles as well as mixtures thereof. More specifically, with regard to the generation of color images including highlight colors utilizing the toner and developer compositions of the present invention, illustrative examples of magenta materials that may be selected include, for example, 2,9-dimethyl-substituted quinacridone and anthraquinone dye identified in the Color Index as CI 60710, CI Dispersed Red 15, a diazo dye identified in the Color Index as CI 26050, CI Solvent Red 10, Lithol Scarlett, Hostaperm, and the like. Illustrative examples of cyan materials that may be used as pigments include copper tetra-4(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, Sudan Blue, and the like; while illustrative examples of yellow pigments that may be selected include diarylide yellow 3,3-dichlorobenzidene acetoacetanilides, a monazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy aceto-acetanilide, Permanent Yellow FGL, and the like. These pigments are generally present in the toner composition in an amount of from about 2 weight percent to about 15 weight percent based on the weight of the toner resin particles.

Illustrative examples of optional charge enhancing additives present in various effective amounts, such as for example from about 0.1 to about 20 percent by weight and preferably from about 0.1 to about 5 percent by weight, include alkyl pyridinium halides, such as cetyl pyridinium chlorides, reference U.S. Pat. No. 4,298,672, the disclosure of which is totally incorporated herein by reference; cetyl pyridinium tetrafluoroborates; quaternary ammonium sulfate and sulfonate charge control agents as illustrated in U.S. Pat. No. 4,338,390, the disclosure of which is totally incorporated herein by reference; stearyl phenethyl dimethyl ammonium tosylates, reference U.S. Pat. No. 4,338,390, the disclosure of which is totally incorporated herein by reference; distearyl dimethyl ammonium methyl sulfate, reference U.S. Pat. No. 4,560,635, the disclosure of which is totally incorporated herein by reference; stearyl dimethyl hydrogen ammonium tosylate; and other known similar charge enhancing additives providing the objectives of the present invention are accomplished; and the like.

With further respect to the toner and developer compositions of the present invention, an optional component that may be present therein is the linear polymeric alcohol comprised of a fully saturated hydrocarbon backbone with at least about 80 percent of the polymeric chains terminated at one chain end with a hydroxyl group, reference U.S. Ser. No. 004,939, the disclosure of which is totally incorporated herein by reference, which alcohol is represented by the following formula:

$$CH_3(CH_2)_nCH_2OH$$

wherein n is a number of from about 30 to about 300, and preferably of from about 30 to about 100. These alcohols are available from Petrolite Corporation. Particularly preferred polymeric alcohols include those wherein n represents a number of from about 30 to about 50. Therefore, in another embodiment of the present invention there are provided toner compositions with polymeric alcohols of a number average molecular weight as determined by gas chromatography of from about greater than 450 to about 1,400, and preferably of from about 475 to about 750. In addition, the aforementioned polymeric alcohols can be present in the toner and developer compositions illustrated herein in various effective amounts, and can be added as uniformly dispersed internal, or as finely divided uniformly dispersed external additives. More specifically, the polymeric alcohols can be present in an amount of from about 0.05 percent to about 20 percent by weight. Therefore, for example, as internal additives the polymeric alcohols can be present in an amount of from about 0.5 percent by weight to about 20 percent by weight, while as external additives the polymeric alcohols are present in an amount of from about 0.05 percent by weight to slightly less than about 5 percent by weight. Toner and developer compositions with the waxes present internally are formulated by initially blending the toner resin particles, pigment particles, and polymeric alcohols, and other optional components. In contrast, when the polymeric alcohols are present as external additives, the toner composition is initially formulated comprised of, for example, resin particles and pigment particles; and subsequently there is added thereto finely divided polymeric alcohols.

Illustrative examples of carrier particles that can be selected for mixing with the toner compositions disclosed herein include those particles that are capable of triboelectrically obtaining a charge of opposite polarity to that of the toner particles. Accordingly, the carrier particles of the present invention in one embodiment can be selected so as to be of a negative polarity thereby enabling the toner particles which are positively charged to adhere to and surround the carrier particles. Alternatively, there can be selected carrier particles with a positive polarity enabling toner compositions with a negative polarity. Illustrative examples of carrier particles that may be selected include granular zircon, granular silicon, steel, nickel, iron, ferrites, silicon dioxide, and the like. Additionally, there can be selected as carrier particles nickel berry carriers as disclosed in U.S. Pat. No. 3,847,604, which carriers are comprised of nodular carrier beads of nickel characterized by surfaces of reoccurring recesses and protrusions thereby providing particles with a relatively large external area. Preferred carrier particles selected for the present invention are comprised of a magnetic core, such as steel, with a polymeric coating thereover several of which are illustrated, for example, in U.S. Ser. No. 751,922 relating to developer compositions with certain carrier particles, the disclosure of which is totally incorporated herein by reference. More specifically, there are illustrated in the aforementioned copending application carrier particles comprised of a core with a coating thereover of vinyl polymers, or vinyl homopolymers. Examples of specific carriers illustrated in the aforesaid copending application, and particularly useful for the present invention are those comprised of a steel or ferrite core with a coating thereover of a vinyl chloride/trifluorochloroethylene copolymer, which coating contains therein conductive particles, such as carbon black. Other coatings include fluoropolymers, such as polyvinylidene fluoride resins, poly(chlorotrifluoroethylene), fluorinated ethylene and propylene copolymers, terpolymers of styrene, methylmethacrylate, and a silane, such as triethoxy silane, reference U.S. Pat. Nos. 3,467,634 and 3,526,533, the disclosures of which are totally incorporated herein by reference; polytetrafluoroethylene, fluorine containing polyacrylates, and polymethacrylates; copolymers of vinyl chloride; and trichlorofluoroethylene; and other known coatings. There can also be selected as carriers components a core with a double polymer coating thereover, reference U.S. Ser. Nos. 136,791 and 136,792, the disclosures of which are totally incorporated herein by reference. More specifically, there is detailed in these applications a process for the preparation of carrier particles with substantially stable conductivity parameters which comprises (1) mixing carrier cores with a polymer mixture comprising from about 10 to about 90 percent by weight of a first polymer, and from about 90 to about 10 percent by weight of a second polymer, which polymers are not in close proximity in the triboelectric series; (2) dry mixing the carrier core particles and the polymer mixture for a sufficient period of time enabling the polymer mixture to adhere to the carrier core particles; (3) heating the mixture of carrier core particles and polymer mixture to a temperature of between about 200° F. and about 550° F. whereby the polymer mixture melts and fuses to the carrier core particles; and (4) thereafter cooling the resulting coated carrier particles.

Also, while the diameter of the carrier particles can vary, generally they are of a diameter of from about 50 microns to about 1,000 microns, thus allowing these particles to possess sufficient density and inertia to avoid adherence to the electrostatic images during the development process. The carrier particles can be mixed with the toner particles in various suitable combinations, however, best results are obtained when about 1 to about 5 parts per toner to about 10 parts to about 200 parts by weight of carrier are mixed. Polymeric coatings for the carrier components are present in an amount generally of from about 0.1 to about 5 weight percent, however, other coating weights are suitable providing the objectives of the present invention are achieved.

The toner compositions of the present invention can be prepared by a number of known methods, including mechanical blending and melt blending the toner resin particles, pigment particles or colorants, and optional additives followed by mechanical attrition. Other methods include those well known in the art such as spray drying, mechanical dispersion, melt dispersion, extrusion, dispersion polymerization, and suspension polymerization. In one dispersion polymerization method, a solvent dispersion of the resin particles, the pigment particles, and charge enhancing additive are spray dried under controlled conditions to result in the desired product, and melt blending of resin particles, pigment particles, and optional additives.

The toner and developer compositions of the present invention may be selected for use in developing images in electrophotographic imaging systems containing therein, for example, conventional photoreceptors, such as selenium and selenium alloys, including selenium arsenic; selenium tellurium; selenium, tellurium, arsenic; and the like. Also useful, especially wherein there are selected positively charged toner compositions, are layered photoresponsive devices comprised of transport layers and photogenerating layers, reference U.S. Pat. Nos. 4,265,990; 4,585,884; 4,584,253 and 4,563,408, the disclosures of which are totally incorporated herein by reference, and other similar layered photoresponsive devices. Examples of photogenerating layers include selenium, selenium alloys, trigonal selenium, metal phthalocyanines, metal free phthalocyanines and vanadyl phthalocyanines, while examples of charge transport layers include the aryl amines as disclosed in U.S. Pat. No. 4,265,990. Other photoresponsive devices useful in the present invention include 4-dimethylaminobenzylidene, 2-benzylidene-amino-carbazole; 4-dimethamino-benzylidene; (2-nitro-benzylidene)-p-bromoaniline; 2,4-diphenyl-quazoline; 1,2,4-triazine; 1,5-diphenyl-3-methyl pyrazoline; 2-(4'-dimethyl-amino phenyl)-benzoaxzole; 3-aminocarbazole; hydrazone derivatives; polyvinyl carbazole-trinitrofluorenone charge transfer complex; and mixtures thereof. Moreover, there can be selected as photoconductors hydrogenated amorphous silicon; and as photogenerating pigments squaraines, perylenes, and the like.

Furthermore, the toner and developer compositions of the present invention are particularly useful with electrostatographic imaging apparatuses containing a development zone situated between a charge transporting means and a metering charging means, which apparatus is illustrated in U.S. Pat. Nos. 4,394,429 and 4,368,970. More specifically, there is illustrated in the aforementioned '429 patent a self-agitated, two-component, insulative development process and apparatus wherein toner is made continuously available immediately adjacent to a flexible deflected imaging surface, and toner particles transfer from one layer of carrier particles to another layer of carrier particles in a development zone. In one embodiment, this is accomplished by bringing a transporting member, such as a development roller, and a tensioned deflected flexible imaging member into close proximity, that is a distance of from about 0.05 millimeter to about 1.5 millimeters, and preferably from about 0.4 millimeter to about 1.0 millimeter in the present of a high electric field, and causing such members to move at relative speeds. There is illustrated in the aforementioned '970 patent an electrostatographic imaging apparatus comprised of an imaging means, a charging means, an exposure means, a development means, and a fixing means, the improvement residing in the development means comprising in operative relationship a tensioned deflected flexible imaging means; a transporting means; a development zone situated between the imaging means and the transporting means, the development zone containing therein electrically insulating magnetic carrier particles, means for causing the flexible imaging means to move at a speed of from about 5 cm/sec to about 50 cm/sec, means for causing the transporting means to move at a speed of from about 6 cm/sec to about 100 cm/sec, the means for imaging and the means for transporting moving at different speeds; and the means for imaging and the means for transporting having a distance therebetween of from about 0.05 millimeter to about 1.5 millimeters.

The following examples are being submitted to further define various species of the present invention. These examples are intended to illustrate and not limit the scope of the present invention. Also, parts and percentages are by weight unless otherwise indicated.

EXAMPLE I

There was charged in a 250 milliliter, 3 necked round bottom flask, methylhydroquinone (1 mole), pyridine (2 moles) and tetrahydrofuran (200 milliliters). To this mixture was added dropwise with a syringe pump a solution of terephthaloyl chloride (0.2 mole) in methylene chloride under a nitrogen atmosphere over a 2 hour period. After overnight stirring, the mixture was neutralized with aqueous HCl(1N), and the organic extract was separated and washed with brine. The extracted organic portion was then added dropwise to hot water (65° C.); the resulting slurry cooled to room temperature and filtered to provide the crude product. Purification was then accomplished by dissolving the product in acetone, followed by precipitation in hot water (65° C.). The precipitate was then filtered warm (40° to 45° C.). This purification procedure was repeated yielding the product p,p-di-(methylphenoxy)-terephthalate, about 85 percent yield, with a melting point of 189° to 191° C.

Figure 3:
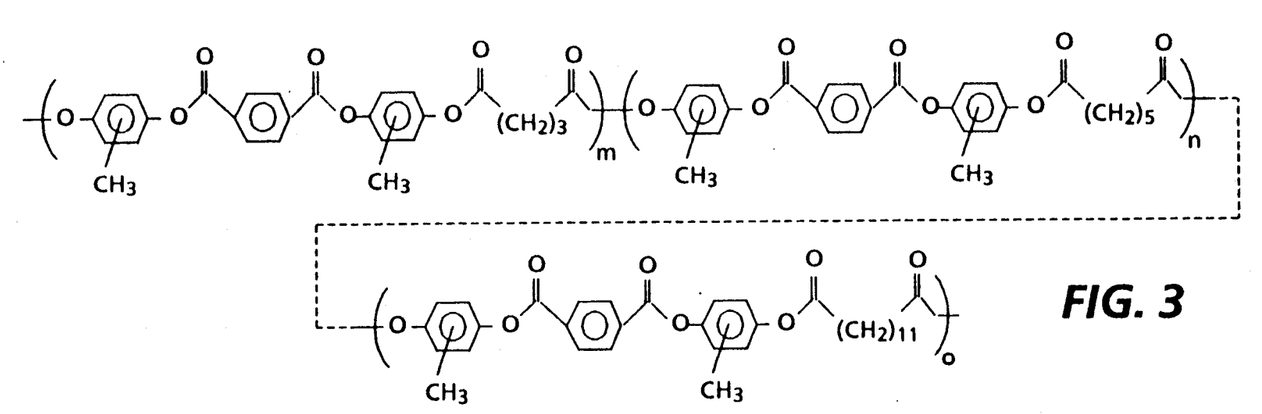

To p,p-di-(methylphenoxy)-terephthalate (1 millimole), pyridine (3 millimoles) and methylene chloride (60 milliliters) was added dropwise a solution of glutaryl chloride (0.33 millimole), pimeloyl chloride (0.33 millimole) and brassiloyl chloride (0.33 millimole) in methylene chloride under an inert atmosphere over a one hour period. After overnight stirring, about 16 hours, the resulting clear solution was washed with aqueous HCl, followed by washing with water. The resulting organic extract was then added dropwise with hexane (1 liter) whereby the precipitated copolyester product was filtered off and dried to yield the random copolymer of FIG. 3 in a 95 percent yield. More specifically, there was obtained as evidenced by elemental analysis nuclear magnetic resonance and infrared spectroscopy, the product as illustrated in FIG. 3, wherein m, n, and o represent the number of repeating segments. Thereafter, the product was characterized with DSC, differential scanning calorimetry, TGA, TMA, thermomechanical analysis, TGA, thermogravimetric analysis, Rheometrics Rheological spectrometer analysis, X-ray diffraction and Optical Microscopy equipped with a hot-stage.

The DSC thermogram of this polymer indicated a glass transition of about 39° C. to about 42° C., a melting point transition from the crystalline solid state to the liquid crystalline of from about 75° to 120° C., and a clearing point transition from the liquid crystalline state to the isotropic melt of about 304° C. Moreover, the TGA results indicated that this polymer was stable up to 313° C. The intrinsic viscosity of this random polymer product was 0.25 dl/gram using methylene chloride as the solvent. The TMA indicated a softening point of 99° C. at 50 percent penetration using a 10 gram weight. Rheological measurement revealed that the melt viscosity of the above prepared copolyester illustrated in FIG. 3 decreased from an initial viscosity of $10^7$ poise at 75° C. to approximately 50 poise at 120° C. Also, this polymer exhibited a decrease in melt viscosity of from about 4 to about 6 orders in magnitude at temperatures of about 60° to 130° C.

EXAMPLE II

To p,p-di-(methylphenoxy)-terephthalate (1 millimole), pyridine (3 millimoles) and methylene chloride (60 milliliters) was added dropwise a solution of glutaryl chloride (0.33 millimole), pimeloyl chloride (0.33 millimole) and sebacoyl chloride (0.33 millimole) in methylene chloride under an inert atmosphere over a one hour period. After overnight stirring, about 16 hours, the resulting clear solution was washed with aqueous HCl, followed by washing with water. The resulting organic extract was then added dropwise to hexane (1 liter), whereby the precipitated copolyester product was filtered off and dried to provide a 95 percent yield. There was obtained as evidenced by elemental analysis, nuclear magnetic resonance and infrared spectroscopy, the random polymer product as illustrated in FIG. 4, wherein m, n, and o are repeating segments.

Figure 4:
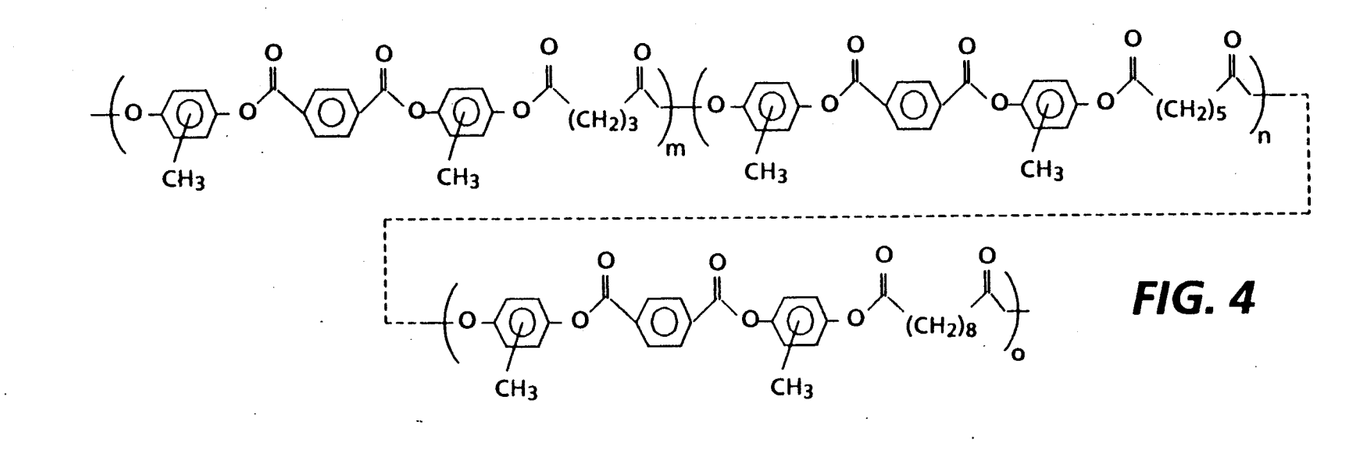

The DSC thermogram of this polymer product of FIG. 4 indicated a glass transition of about 42° C. to about 47° C., a melting point transition from the crystalline solid state to the liquid crystalline of from about 72° to 140° C., and a clearing point transition from the liquid crystalline state to the isotropic melt of about 294° C. Moreover, the TGA results indicated that this random polymer was stable up to 293° C. The intrinsic viscosity of this polymer was 0.229 dl/gram using methylene chloride as the solvent. The TMA indicated a softening point of 80° estimated at 50 percent penetration using a 10 gram weight. Rheological measurement revealed that the melt viscosity of this copolyester decreased from an initial viscosity of $10^7$ poise at 70° C. to approximately 50 poise at 125° C.

EXAMPLE III

Figure 5:
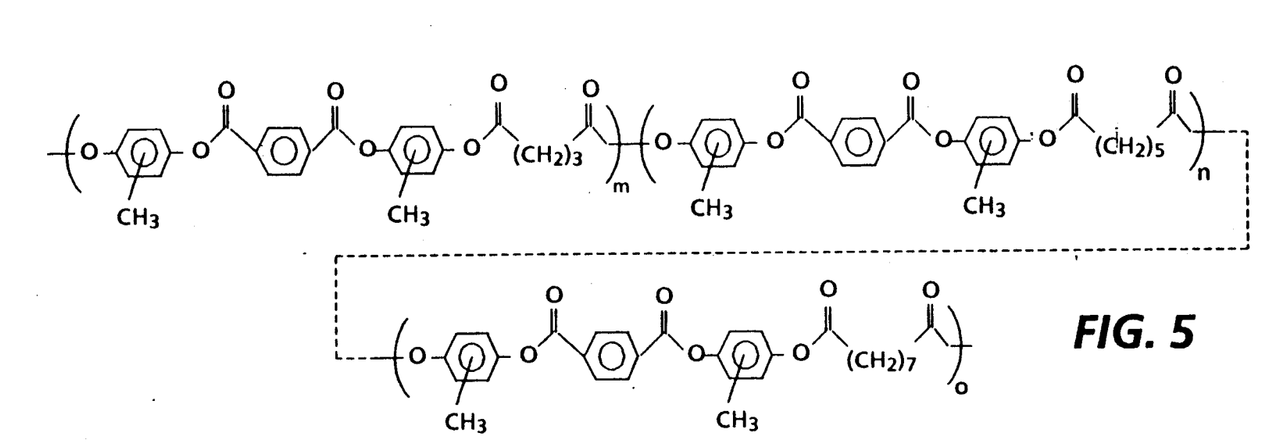

To p,p-di-(methylphenoxy)-terephthalate (1 millimole), pyridine (3 millimoles) and methylene chloride (60 milliliters) was added dropwise a solution of glutaryl chloride (0.33 millimole), pimeloyl chloride (0.33 millimole) and azeloyl chloride (0.33 millimole) in methylene chloride under an inert atmosphere over a one hour period. After overnight stirring, the resulting clear solution was washed with aqueous HCl, followed by washing with water. The resulting organic extract was then added dropwise to hexane (1 liter), whereby the precipitated random copolyester product was filtered off and dried to provide a 95 percent yield. There was obtained as evidenced by elemental analysis nuclear magnetic resonance and infrared spectroscopy, the product as illustrated in FIG. 5 wherein m, n, and o are repeating segments.

The DSC thermogram of the above obtained polymer product indicated a glass transition of about 48° C. to about 53° C., a melting point transition from the crystalline solid state to the liquid crystalline of from about 103° to 140° C., and a clearing point transition from the liquid crystalline state to the isotropic melt of about 292° C. Moreover, the TGA results indicated that this polymer was stable up to 312° C. The intrinsic viscosity of this polymer was 0.230 dl/gram using methylene chloride as the solvent. The TMA indicated a softening point of 98° C. estimated at 50 percent penetration using a 10 gram weight. Rheological measurement revealed that the melt viscosity of the above prepared random copolyester decreased from an initial viscosity of $10^7$ poise at 115° C. to approximately 50 poise at 130° C.

EXAMPLE IV

Figure 6:
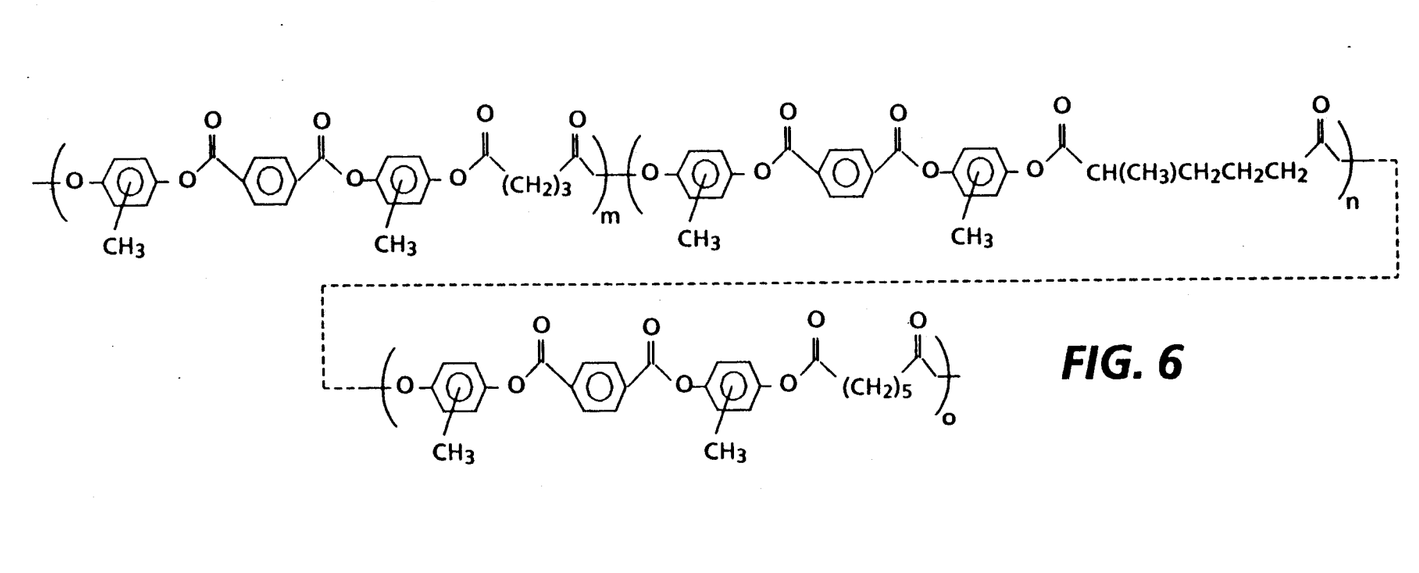

To p,p-di-(methylphenoxy)-terephthalate (1 millimole), pyridine (3 millimoles) and methylene chloride (60 milliliters) was added dropwise a solution of glutaryl chloride (0.33 millimole), pimeloyl chloride (0.33 millimole) and 3-methyladipoyl chloride (0.33 millimole) in methylene chloride under an inert atmosphere over a one hour period. After overnight stirring, the resulting clear solution was washed with aqueous HCl, followed by washing with water. The resulting organic extract was then added dropwise to hexane (1 liter), whereby the precipitated random copolyester product was filtered off and dried to provide a 95 percent yield. There was obtained as evidenced by elemental analysis nuclear magnetic resonance and infrared spectroscopy, the random polymer product as illustrated in FIG. 6 wherein m, n, and o are repeating segments.

The DSC thermogram of the above obtained random polymer indicated a glass transition of about 52° C. to about 56° C., a melting point transition from the crystalline solid state to the liquid crystalline of from about 82° to 120° C., and a clearing point transition from the liquid crystalline state to the isotropic melt of about 312° C. Moreover, the TGA results indicated that this polymer was stable up to 325° C. The intrinsic viscosity of this polymer was 0.283 dl/gram using methylene chloride as the solvent. The TMA, indicated a softening point of 92° C. estimated at 50 percent penetration using a 10 gram weight. Rheological measurement revealed that the melt viscosity of this random copolyester product decreased from an initial viscosity of $10^7$ poise at 100° C. to approximately 50 poise at 120° C.

EXAMPLE V

Figure 7:
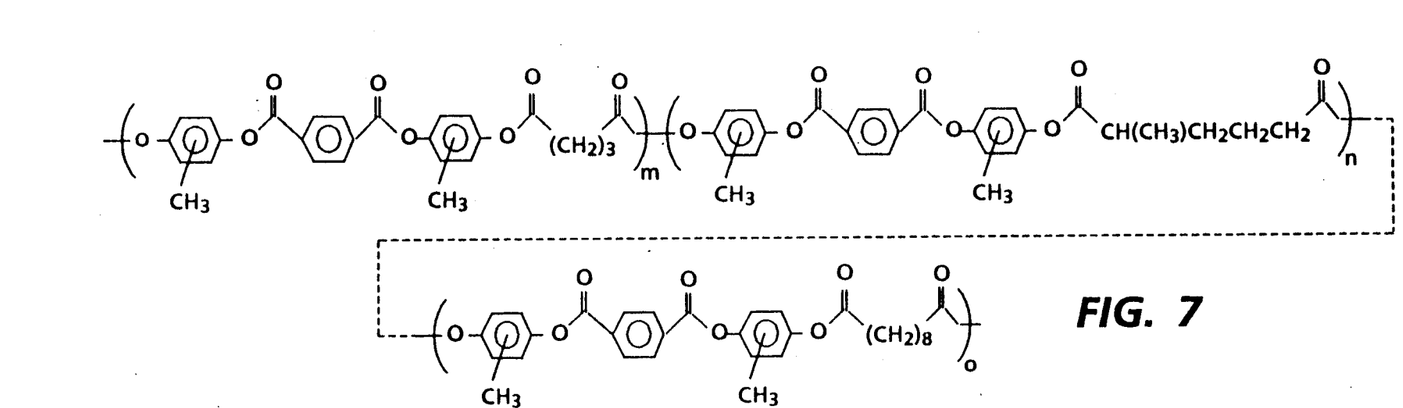

To p,p-di-(methylphenoxy)-terephthalate (1 millimole), pyridine (3 millimoles) and methylene chloride (60 milliliters) was added dropwise a solution of glutaryl chloride (0.33 millimole), sebacoyl chloride (0.33 millimole) and 3-methyladipoyl chloride (0.33 millimole) in methylene chloride under an inert atmosphere over a one hour period. After overnight stirring, the resulting clear solution was washed with aqueous HCl, followed by washing with water. The resulting organic extract was then added dropwise to hexane (1 liter), whereby the precipitated copolyester product was filtered off and dried to provide a 95 percent yield. There was obtained as evidenced by elemental analysis nuclear magnetic resonance and infrared spectroscopy, the product as illustrated in FIG. 7 wherein m, n, and o are repeating segments.

The DSC thermogram of the above obtained random polymer product indicated a glass transition of about 47° C. to about 51° C., a melting point transition from the crystalline solid state to the liquid crystalline of from about 60° to 90° C., and a clearing point transition from the liquid crystalline state to the isotropic melt of about 307° C. Moreover, the TGA results indicated that this polymer was stable up to 326° C. The intrinsic viscosity of this polymer was 0.223 dl/gram using methylene chloride as the solvent. The TMA indicated a softening point of 75° C. at 50 percent penetration using a 10 gram weight. Rheological measurement revealed that the melt viscosity of this random copolyester product illustrated in FIG. 7 decreased from an initial viscosity of $10^7$ poise at 60° C. to approximately 50 poise at 100° C.

EXAMPLE VI

Figure 8:
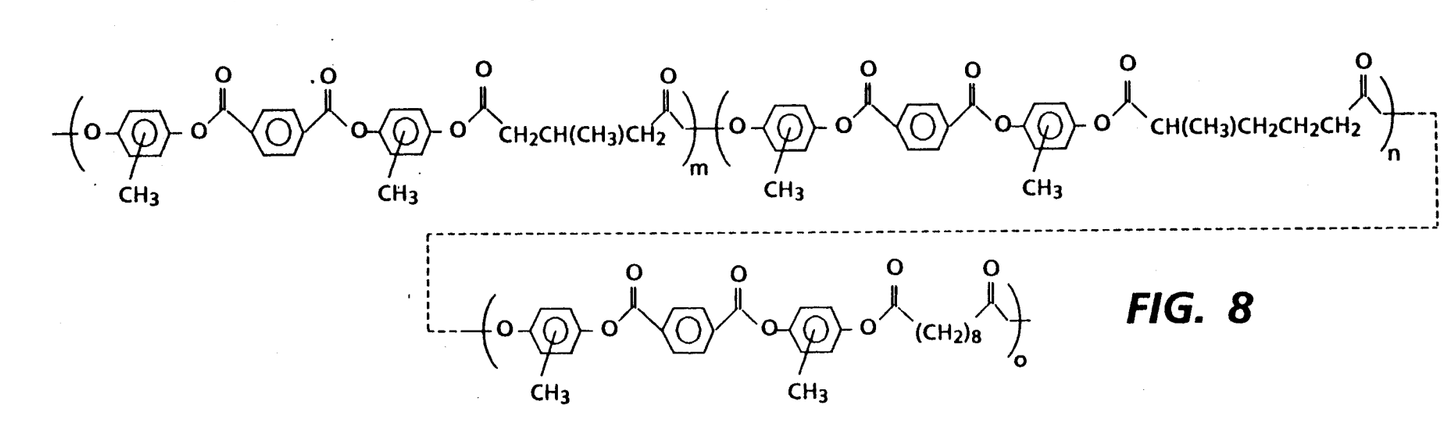

To p,p-di-(methylphenoxy)-terephthalate (1 millimole), pyridine (3 millimoles) and methylene chloride (60 milliliters) was added dropwise a solution of 3-methylglutaryl chloride (0.33 millimole), 3-methyladipoyl chloride (0.33 millimole) and sebacoyl chloride (0.33 millimole) in methylene chloride under an inert atmosphere over a one hour period. After overnight stirring, the resulting clear solution was washed with aqueous HCl, followed by washing with water. The resulting organic extract was then added dropwise to hexane (1 liter), whereby the precipitated copolyester was filtered off and dried to provide a 95 percent yield. There was obtained as evidenced by elemental analysis nuclear magnetic resonance and infrared spectroscopy, the product as illustrated in FIG. 8 wherein m, n, and o are repeating segments.

The DSC thermogram of the above obtained polymer product indicated a glass transition of about 47° C. to about 52° C., a melting point transition from the crystalline solid state to the liquid crystalline of from about 55° to 85° C., and a clearing point transition from the liquid crystalline state to the isotropic melt of about 296° C. Moreover, the TGA results indicated that this polymer was stable up to 319° C. The intrinsic viscosity of this polymer was 0.180 dl/gram using methylene chloride as the solvent. The TMA indicated a softening point of 65° C. at 50 percent penetration using a 10 gram weight. Rheological measurement revealed that the melt viscosity of the copolyester product obtained as illustrated in FIG. 8 decreased from an initial viscosity of $10^7$ poise at 55° C. to approximately 50 poise at 95° C.

EXAMPLE VII

Figure 9:
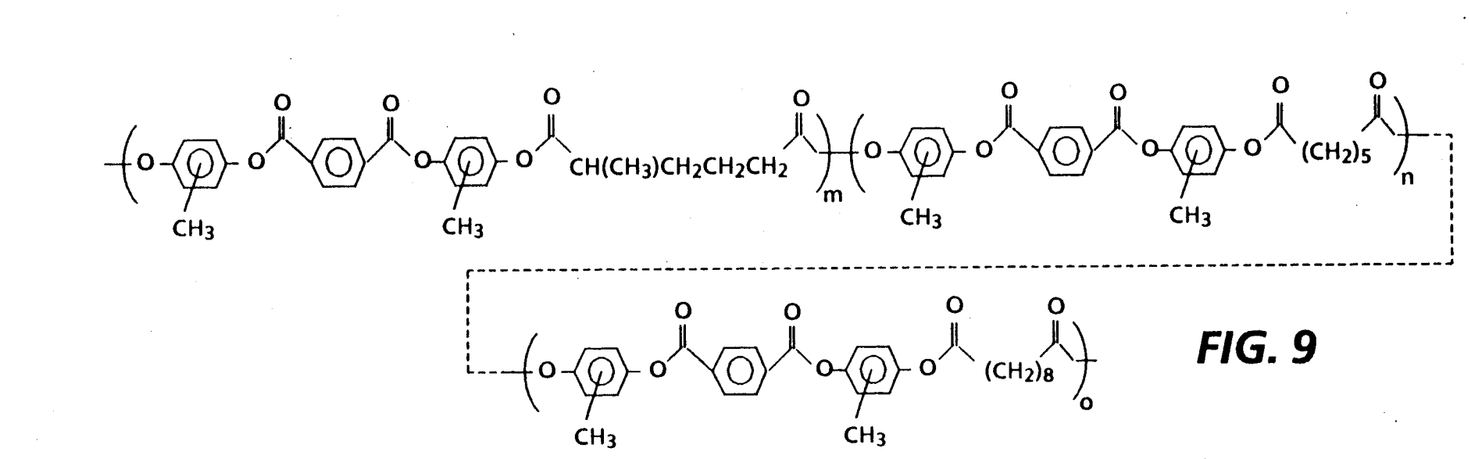

To p,p-di-(methylphenoxy)-terephthalate (1 millimole), pyridine (3 millimoles) and methylene chloride (60 milliliters) was added dropwise a solution of glutaryl chloride (0.33 millimole), 3-methyladipoyl chloride (0.33 millimole) and sebacoyl chloride (0.33 millimole) in methylene chloride under an inert atmosphere over a one hour period. After overnight stirring, the resulting clear solution was washed with aqueous HCl, followed by water. The resulting organic extract was then added dropwise to hexane (1 liter), whereby the precipitated copolyester product was filtered off and dried to provide a 95 percent yield. There was obtained as evidenced by elemental analysis nuclear magnetic resonance and infrared spectroscopy, the product as illustrated in FIG. 9 wherein m, n, and o are repeating segments.

The DSC thermogram of the above obtained polymer product indicated a glass transition of about 43° C. to about 48° C., a melting point transition from the crystalline solid state to the liquid crystalline of from about 60° to 85° C., and a clearing point transition from the liquid crystalline state to the isotropic melt of about 295° C. Moreover, the TGA results indicated that this polymer was stable up to 295° C. The intrinsic viscosity of this polymer was 0.345 dl/gram using methylene chloride as the solvent, and the weight average molecular weight of the polymer product $M_w$ was 7,800 as determined by GPC. The TMA indicated a softening point of 65° C. at 50 percent penetration using a 10 gram weight. Rheological measurement revealed that the melt viscosity of the obtained copolyester product as illustrated in FIG. 9 decreased from an initial viscosity of $10^7$ poise at 60° C. to approximately 50 poise at 95° C.

EXAMPLE VIII

To biphenol (0.5 mole) and 200 milliliters of absolute ethanol and sodium hydroxide (1.1 millimole) at 80° C. was added dropwise a solution of 2-chloroethanol (1 mole) in 50 milliliters of absolute ethanol. The mixture was refluxed for 48 hours, and then filtered hot and washed twice with boiling ethanol (100 milliliters). Recrystallization from boiling water provided the precursor product biphenol-diethanol, 80 to 85 percent yield of colorless crystals. The melting point for this product was 210° to 211° C.

Figure 10:
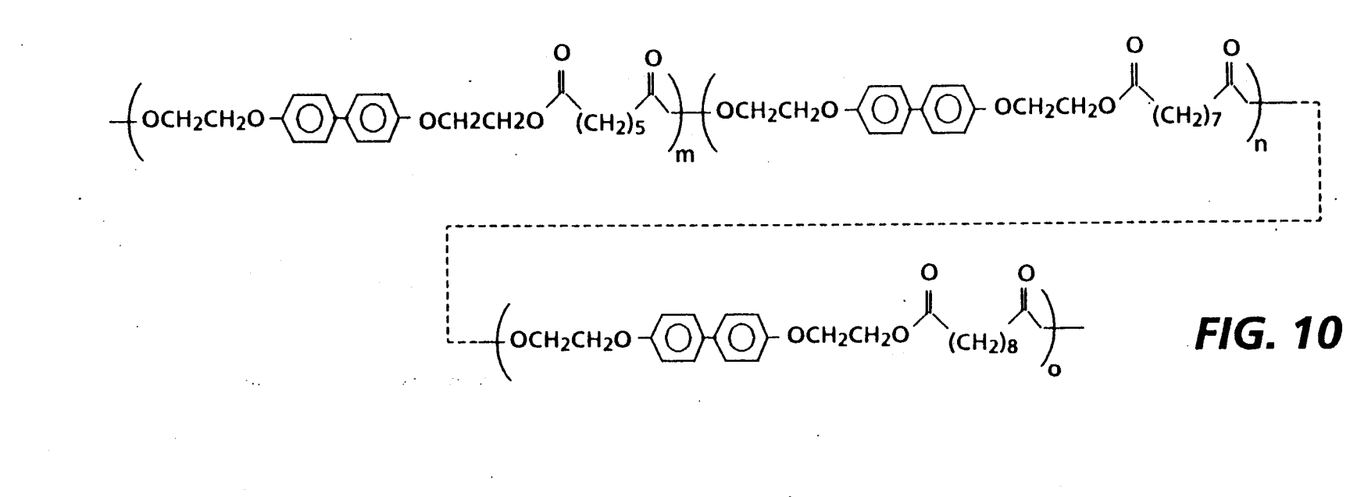

To the above prepared precursor biphenol-diethanol (10 millimoles) and pyridine (30 millimoles) in dry 1,2-dichloroethane was added azeloyl chloride (3.33 millimoles), pimeloyl chloride (3.33 millimoles), and sebacoyl chloride (3.33 millimoles). The mixture was then refluxed overnight, about 16 hours, on an oil bath maintained at a temperature of from about 40° to 60° C., cooled and washed with dilute aqueous HCl, water and finally with brine. The resulting organic portion was then separated by filtration and added to methanol (1 liter). The product was then filtered off and dried to provide the copolymer product in 75 yield. There was obtained as evidenced by elemental analysis nuclear magnetic resonance and infrared spectroscopy, the product as illustrated in FIG. 10 wherein m, n, and o are repeating segments.

The DSC thermogram of this polymer indicated a melting point transition from the crystalline solid state to the liquid crystalline of from about 100° to 108° C., and a clearing point transition from the liquid crystalline state to the isotropic melt of about 175° C. Moreover, the TMA indicated a softening point of 115° C. at 50 percent penetration using a 10 gram weight. The above prepared random polymer product had an intrinsic viscosity of 0.25.

EXAMPLE IX

Figure 11:
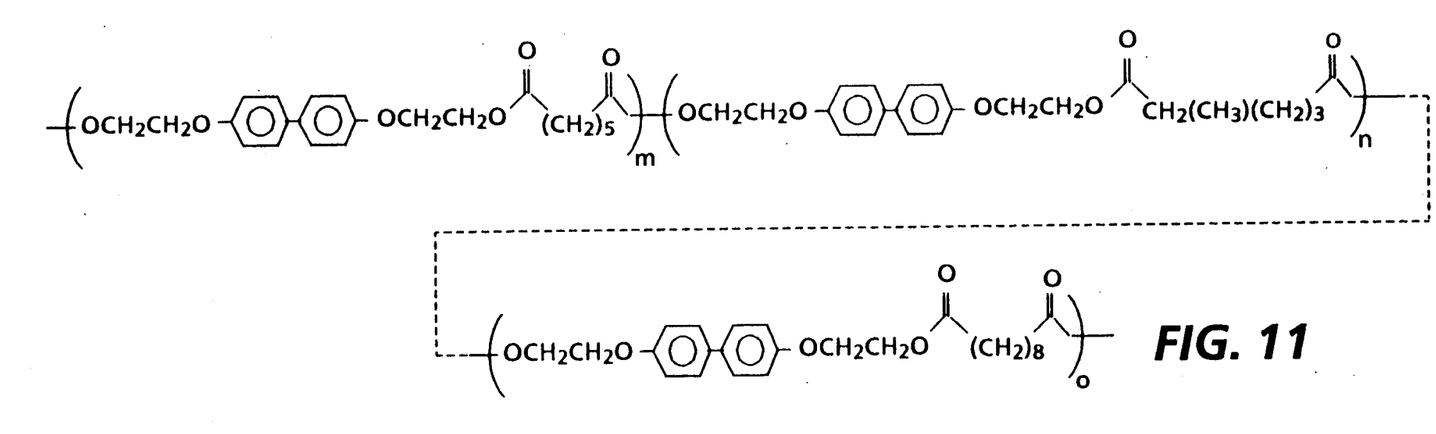

To biphenol-diethanol (10 millimoles) and pyridine (30 millimoles) in dry 1,2-dichloroethane was added 3-methyladipoyl chloride (3.33 millimoles), pimeloyl chloride (3.33 millimoles), and sebacoyl chloride (3.33 millimoles). The mixture was then refluxed overnight on an oil bath maintained at a temperature of from about 40° to 60° C., cooled and washed with dilute aqueous HCl, water and finally washed with brine. The resulting organic portion was then separated and added to methanol (1 liter). The product was then filtered off, and dried to provide the copolymer product in 75 percent yield. There was obtained as evidenced by elemental analysis nuclear magnetic resonance and infrared spectroscopy, the product as illustrated in FIG. 11 wherein m, n, and o are repeating segments.

The DSC thermogram of the above prepared polymer product indicated a melting point transition from the crystalline solid state to the liquid crystalline of from about 100° to 118° C., and a clearing point transition from the liquid crystalline state to the isotropic melt of about 130° C. Moreover, the TMA indicated a softening point for this polymer of 118° C. at 50 percent penetration using a 10 gram weight. The above prepared random polymer product had an intrinsic viscosity of 0.3.

EXAMPLE X

Figure 12:
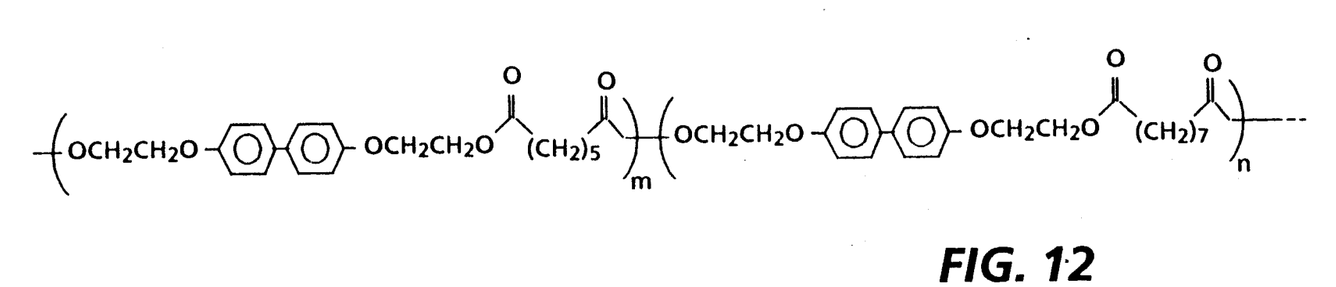

To biphenol-diethanol (10 millimoles) and pyridine (30 millimoles) in dry 1,2-dichloroethane was added pimeloyl chloride (5.0 millimoles), and azeloyl chloride (5.0 millimoles). The mixture was then refluxed overnight on an oil bath maintained at a temperature of from about 40° to 60° C., cooled and washed with dilute aqueous HCl, water and finally with brine. The organic portion was then separated with some precipitated product and added to methanol (1 liter). The product was then filtered off and dried to provide the copolymer product in 75 percent yield. There was obtained as evidenced by elemental analysis nuclear magnetic resonance and infrared spectroscopy, the random polymer product as illustrated in FIG. 12 wherein m and n are repeating segments.

The DSC thermogram of the above obtained polymer product indicated a melting point transition from the crystalline solid state to the liquid crystalline of from about 70° to 90° C., and a clearing point transition from the liquid crystalline state to the isotropic melt of about 95° C. Moreover, the TMA indicated a softening point of 89° C. at 50 percent penetration using a 10 gram weight. Rheological measurement revealed that the melt viscosity of the copolyester product obtained as illustrated in FIG. 12 increased from an initial viscosity of $10^7$ poise at 80° C. to approximately $10^9$ poise at 85° C., and then decreased to $10^2$ poise at about 95° C. The above prepared random polymer product had an intrinsic viscosity of 0.275.

EXAMPLE XI

Figure 13:
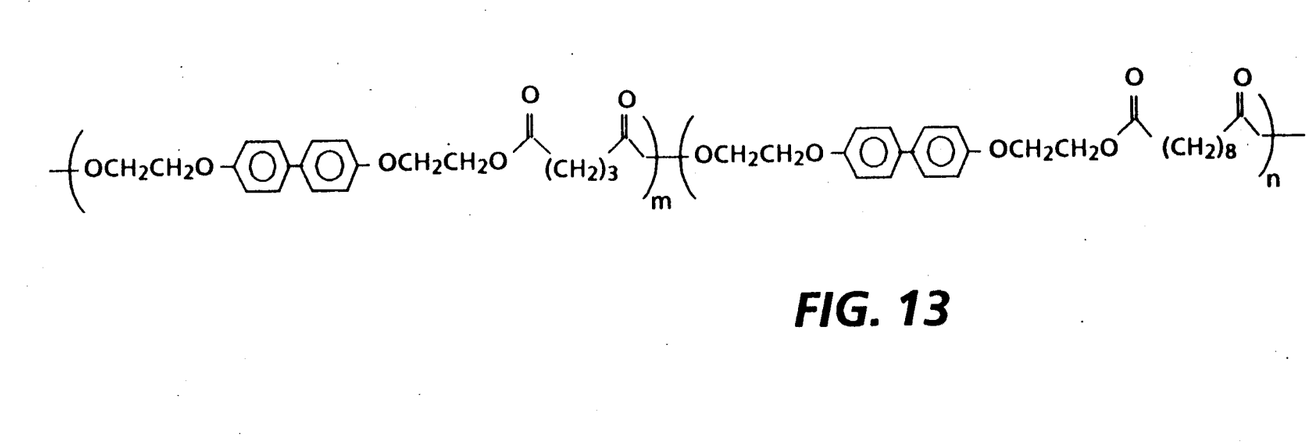

To biphenol-diethanol (10 millimoles) and pyridine (30 millimoles) in dry 1,2-dichloroethane was added glutaryl chloride (5.0 millimoles), and sebacoyl chloride (5.0 millimoles). The mixture was then refluxed overnight on an oil bath maintained at a temperature of from about 40° to 60° C., cooled and washed with dilute aqueous HCl, water and finally washed with brine. The resulting organic portion was then separated and added to methanol (1 liter). The product was then filtered off and dried to provide the copolymer in 75 percent yield. There was obtained as evidenced by elemental analysis nuclear magnetic resonance and infrared spectroscopy, the product as illustrated in FIG. 13 wherein m, and n represent repeating segments.

The DSC thermogram of the above obtained polymer indicated a melting point transition from the crystalline solid state to the liquid crystalline of about 120° C., and a clearing point transition from the liquid crystalline state to the isotropic melt of about 146° C. Moreover, the TMA indicated a softening point of 128° C. at 50 percent penetration using a 10 gram weight. Also, the above prepared polymer product had an intrinsic viscosity of 0.28.

EXAMPLE XII

Figure 14:
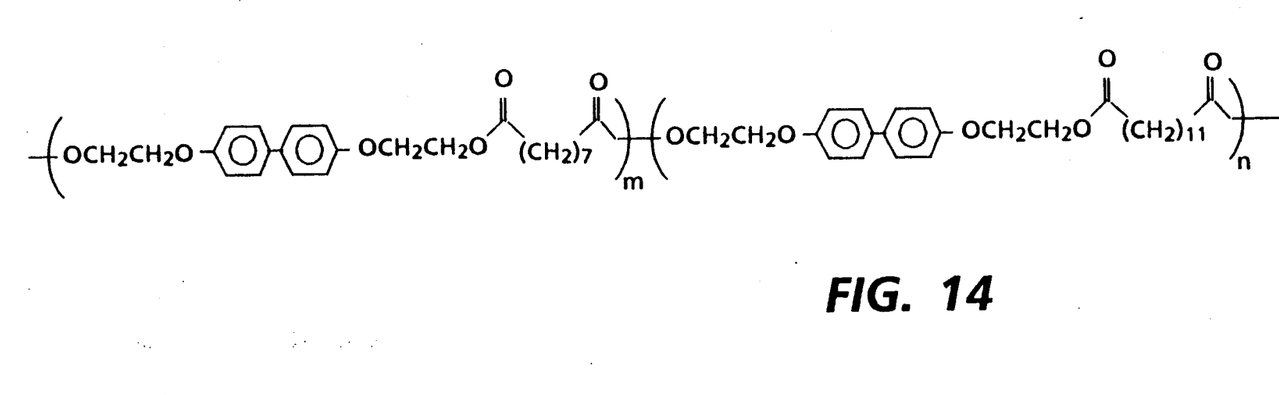

To biphenol-diethanol (10 millimoles) and pyridine (30 millimoles) in dry 1,2-dichloroethane was added azeloyl chloride (5.0 millimoles), and brassiloyl chloride (5.0 millimoles). The mixture was then refluxed overnight on an oil bath maintained at a temperature from about 40° to 60° C., cooled and washed with dilute aqueous HCl, water and thereafter washed with brine. The resulting organic portion was then separated and added to methanol (1 liter). The product was then filtered off, and dried to provide the copolymer as represented by FIG. 14 in 75 percent yield. There was obtained as evidenced by elemental analysis nuclear magnetic resonance and infrared spectroscopy, the copolymer product as illustrated in FIG. 14 wherein m, and n represent repeating segments.

The DSC thermogram of this polymer indicated a melting point transition from the crystalline solid state to the liquid crystalline of about 96° C., and a clearing point transition from the liquid crystalline state to the isotropic melt of about 104° C. Moreover, the TMA indicated a softening point for this polymer of 97° C. estimated at 50 percent penetration using a 10 gram weight. Also, the above prepared polymer product had an intrinsic viscosity of 0.25.

EXAMPLE XIII

To biphenol-diethanol (10 millimoles) and pyridine (30 millimoles) in dry 1,2-dichloroethane was added glutaryl chloride (5.0 millimoles), and 3-methyladipoyl chloride (5.0 millimoles). The mixture was then refluxed overnight on an oil bath maintained at a temperature from about 40° to 60° C., cooled and washed with dilute aqueous HCl, water and thereafter washed with brine. The resulting organic portion was then separated and added to methanol (1 liter). The product was then filtered off, and dried to provide the copolymer of FIG. 15 in 75 percent yield. There was obtained as evidenced by elemental analysis nuclear magnetic resonance and infrared spectroscopy, the product as illustrated in FIG. 15 wherein m, and n represent repeating segments.

The DSC thermogram of this polymer indicated a melting point transition from the crystalline solid state to the liquid crystalline of about 172° C., and a clearing point transition from the liquid crystalline state to the isotropic melt of about 185° C. Moreover, the TM indicated a softening point of 191° C. at 50 percent penetration using a 10 gram weight. Also, the above prepared polymer product had an intrinsic viscosity of 0.26.

EXAMPLE XIV

A toner composition was prepared with a polymer substantially identical to that of Example VII. To a mixture of p,p-di-(methylphenoxy)-terephthalate (0.1 mole), pyridine or triethylamine (0.3 mole) and dichloromethane was added dropwise with a syringe pump a mixture of 3-methyladipoyl dichloride (0.033 millimole), pimeloyl dichloride (0.33 millimole), and sebacoyl dichloride (0.033 mole). The mixture was then left undisturbed overnight, about 16 hours, and then neutralized with dilute aqueous HCl. The resulting organic portion was then separated, washed with water followed by washing brine and then precipitated in methanol. The copolyester product was then filtered off and dried to provide a yield in excess of 95 percent. The above obtained random polymer product possessed substantially identical characteristics as the polymer of Example VII.

There was then formulated by extrusion processing followed by micronization and classification a positive charging toner, about 20 microcoulombs per gram as determined by the know Faraday cage method, with 10 percent by weight of Regal 330 ® (carbon black), 1 percent of DDAMS (distearyl dimethyl ammonium methyl sulfate) as the charge enhancing additive and 89 percent by weight of the above prepared thermotropic liquid crystalline copolyester. The extrusion was performed at a barrel temperature of 100° C. and micronization was effected without any difficulties. Thereafter, the black toner particles had an average diameter of about 9 micrometers. The DSC thermogram for this toner indicated a glass transition of from about 45° to about 48° C., and a melting transition of from about 65° to 95° C. The TMA for the above prepared toner revealed a softening point temperature of approximately 71° C. Also, this toner was stable up to about 320° C. Rheological data for the above prepared toner indicated a decrease in melt viscosity of from about $10^7$ poise at 70° C. to about $10^2$ poise at 105° C.

Developer compositions can be prepared by admixing about 3 percent by weight of the above formulated toner composition with carrier particles comprised of a steel core with a coating thereover of polyvinylidene fluoride, 1.25 percent by weight.

Additionally, the above prepared toner composition can be incorporated into xerographic imaging apparatuses including those commercially available as the Xerox Corporation 1075 TM wherein there is selected a layered imaging member, reference U.S. Pat. No. 4,265,550, the disclosure of which is totally incorporated herein by reference, and there can be obtained images of excellent resolution with substantially no background deposits.

Also, a formulated developer composition containing the above prepared toner composition and 97 percent by weight of carrier particles consisting of a steel core with a coating, 0.6 weight percent, thereover of vinyl chloride trifluorochloroethylene copolymer with carbon black particles, 20 weight percent dispersed therein, can be incorporated into an electrostatographic imaging device with a toner transporting means, a toner metering charging means, and a development zone as illustrated in U.S. Pat. No. 4,394,429, the disclosure of which is totally incorporated herein by reference; and wherein the imaging member is comprised of an aluminum supporting substrate, a photogenerating layer of trigonal selenium, and a charge transport layer thereover of the aryl amine N,N'-diphenyl-N,N'-bis(3-methylphenyl) 1,1'-biphenyl-4,4'-diamine, 50 percent by weight, dispersed in 50 percent by weight of the polycarbonate resin available as Makrolon, reference U.S. Pat. No. 4,265,990, the disclosure of which is totally incorporated herein by reference.

There can be obtained in the aforementioned imaging fixture images of acceptable quality with no background deposits for about 50,000 developed images.

Other modifications of the present invention may occur to those skilled in the art subsequent to a review of the present application. The aforementioned modifications, including equivalents thereof, are intended to be included within the scope of the present invention.

What is claimed is:

1. Random copolyester thermotropic liquid crystalline polymers represented by the formulas as illustrated in FIGS. 1 and 2 wherein m, n, and o represent the number of monomer segments present and have value from about 1 to about 99 percent providing the sum thereof is equal to 100 percent; and x, y, and z are independently selected from the group consisting of alkyl, substituted alkyl, alkylene, and substituted alkylene, which polymers have a melt processing temperature of from about 90° to about 130° C.

2. Thermotropic liquid crystalline polymers in accordance with claim 1 wherein the weight average molecular weight thereof is from about 5,000 to about 50,000.

3. Thermotropic liquid crystalline polymers in accordance with claim 1 wherein the weight average molecular weight thereof is from about 10,000 to about 30,000.

4. Thermotropic liquid crystalline random polymers of the formulas as illustrated in FIGS. 3 to 16 wherein m, n, and o represent the number of monomer segments present and have values from about 1 to about 99 percent providing the sum thereof is equal to 100 percent; and X, Y, and Z in FIG. 16 are independently selected from the group consisting of alkyl, substituted alkyl, alkylene, and substituted alkylene; and R is independently selected from the group consisting of hydrogen, alkyl, hydroxyl, nitro, alkoxy, and arylalkoxy, which polymers have a melt processing temperature of from about 90° to about 130° C.

5. Low melting thermotropic liquid crystalline polymers as represented by the formula illustrated in FIG. 16 wherein m, n, and o represent the number of monomer segments present and have values from about 1 to about 99 percent providing the sum thereof is equal to 100 percent; and wherein three or more different spacer groups are linked by aromatic species, and wherein R is independently selected from the group consisting of hydrogen, hydroxy, alkyl, alkoxy, halogen, arylalkoxy, and nitro, and x, y and z are independently selected from the group consisting of alkyl, substituted alkyl, alkylene, and substituted alkylene, which polymers have a melt processing temperature of from about 90° to about 130° C.

6. Thermotropic liquid crystalline random polymers in accordance with claim 1 wherein m, n, and o are from about 1 to about 99 percent providing the sum thereof is equal to 100 percent.

7. Thermotropic liquid crystalline random polymers in accordance with claim 1 wherein m, n, and o are about 33.3 percent.

8. Thermotropic liquid crystalline random polymers in accordance with claim 4 wherein m, n, and o are from about 1 to about 99 percent providing the sum thereof is equal to 100 percent.

9. Thermotropic liquid crystalline random polymers in accordance with claim 1 wherein alkyl contains from 1 to about 25 carbon atoms.

10. Thermotropic liquid crystalline random polymers in accordance with claim 1 wherein alkylene contains from 1 to about 25 carbon atoms.

11. Random copolyester thermotropic liquid crystalline polymers in accordance with claim 1 wherein x, y, and z represent different groups.

* * * * *